(12) United States Patent  (10) Patent No.: US 10,063,914 B2
Imoto et al.  (45) Date of Patent: Aug. 28, 2018

(54) INFORMATION DEVICE

(71) Applicant: Funai Electric Co., Ltd., Daito, Osaka (JP)

(72) Inventors: Yoshinobu Imoto, Osaka (JP); Yoshikazu Fujita, Osaka (JP); Eiji Nakata, Osaka (JP); Ryuji Ikeda, Osaka (JP); Masahito Teraoka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/251,305

(22) Filed: Aug. 30, 2016

(65) Prior Publication Data

US 2017/0070777 A1  Mar. 9, 2017

(30) Foreign Application Priority Data

Sep. 8, 2015  (JP) ................. 2015-176938

(51) Int. Cl.
*H04N 21/4402* (2011.01)
*H04N 21/854* (2011.01)
(Continued)

(52) U.S. Cl.
CPC .......... *H04N 21/4402* (2013.01); *G06F 9/46* (2013.01); *G06F 9/485* (2013.01); *G11B 27/031* (2013.01);
(Continued)

(58) Field of Classification Search
CPC .......... H04N 21/4402; H04N 21/4126; H04N 21/433; H04N 21/4394; H04N 21/440218; H04N 21/8456; H04N 21/85406; H04N 21/4312; H04N 21/47217; H04N 21/8547; G06F 9/46; G06F 9/485; G11B 27/031
See application file for complete search history.

(56) References Cited

U.S. PATENT DOCUMENTS 9,532,210 B2 * 12/2016 Hao .................. H04W 8/22
2004/0133847 A1 * 7/2004 Iino .................. G06F 21/10
715/200

(Continued)

FOREIGN PATENT DOCUMENTS

JP    2003-288290 A   10/2003
WO   2014-035645 A1   3/2014

OTHER PUBLICATIONS

Extended European Search Report of the corresponding European Application No. 16187454.0, dated Feb. 7, 2017.
(Continued)

*Primary Examiner* — Oleg Asanbayev
(74) *Attorney, Agent, or Firm* — Global IP Counselors, LLP

(57) ABSTRACT

An information device includes a communication component and a controller. The communication component communicates with an external device. The controller downloads video data from the external device through the communication component, executes a post-download processing for playing the video data after completing download of the video data, and executes an application for playing the video data. The controller sends a download request for the video data to the external device based on a processing time for the post-download processing.

19 Claims, 11 Drawing Sheets

(51) Int. Cl.
  *H04N 21/41* (2011.01)
  *G06F 9/46* (2006.01)
  *G06F 9/48* (2006.01)
  *G11B 27/031* (2006.01)
  *H04N 21/433* (2011.01)
  *H04N 21/845* (2011.01)
  *H04N 21/439* (2011.01)
  *H04N 21/8547* (2011.01)
  *H04N 21/431* (2011.01)
  *H04N 21/472* (2011.01)

(52) U.S. Cl.
  CPC ....... *H04N 21/4126* (2013.01); *H04N 21/433* (2013.01); *H04N 21/4394* (2013.01); *H04N 21/440218* (2013.01); *H04N 21/8456* (2013.01); *H04N 21/85406* (2013.01); *H04N 21/4312* (2013.01); *H04N 21/47217* (2013.01); *H04N 21/8547* (2013.01)

(56) References Cited

U.S. PATENT DOCUMENTS

| | | | | |
|---|---|---|---|---|
| 2009/0094652 A1* | 4/2009 | Al Adham | ......... | H04N 7/17318 725/103 |
| 2009/0106356 A1* | 4/2009 | Brase | ................. | G06F 17/3002 709/203 |
| 2012/0036350 A1* | 2/2012 | Kuno | ................. | H04N 21/8358 713/150 |
| 2013/0311613 A1* | 11/2013 | Aleksandrov | ............. | G06F 8/65 709/219 |
| 2014/0267098 A1* | 9/2014 | Na | .......................... | G06F 3/041 345/173 |
| 2015/0030001 A1* | 1/2015 | Koskinen | ................ | H04W 8/08 370/331 |

OTHER PUBLICATIONS

Unknown, "Video Converter App User Manual" website, http://www.videoconverterapp.com/video-converter-app-user-manual.pdf, Apr. 21, 2013.

Anonymous, "iOS 7 Background Execution and Multitasking—[x]cube LABS" website, https://www.ucubelabs.com/our-blog/ios-7-background-execution-and-multitasking/, Aug. 14, 2013.

Anonymous, "ios—Mp4 to HLS using ffmpeg—Stack Overflow" website, http://stackoverflow.com/questions/30912542/mp4-to-hls-using-ffmpeg, Jun. 19, 2015.

* cited by examiner (SECOND EMBODIMENT)

CONVERTED URI http:192.168.1.12:55247/dms/contents/xxxxxxxxxx_yyyyyyyyyy.m2ts

UNCONVERTED URI http:192.168.1.12:55247/dms/contents/xxxxxxxxxx.m2ts

FIG. 8

(THIRD EMBODIMENT)

SEEK PLAYBACK TABLE

| | PLAYBACK TIME (SECONDS) | DATA VOLUME (BYTES) |
|---|---|---|
| ONE-SECOND INTERVAL → | 0 | 0 |
| | 1 | 288000 |
| | 2 | 672000 |
| | 3 | 1056000 |
| | 4 | 1344000 |
| | 5 | 1728000 |

FIG. 9

(FOURTH EMBODIMENT)

SEEK PLAYBACK TABLE

| PLAYBACK TIME (SECONDS) | DATA VOLUME (BYTES) |
|---|---|
| 0 | 0 |
| 3 | 1056000 |
| 6 | 2112000 |
| 9 | 3168000 |
| 12 | 4128000 |
| 15 | 4896000 |

THREE-SECOND INTERVAL

INFORMATION DEVICE

CROSS-REFERENCE TO RELATED APPLICATIONS

This application claims priority to Japanese Patent Application No. 2015-176938 filed on Sep. 8, 2016. The entire disclosure of Japanese Patent Application No. 2015-176938 is hereby incorporated herein by reference.

BACKGROUND

Field of the Invention

The present invention generally relates to an information device. More specifically, the present invention relates to an information device that communicates with an external device.

Background Information

Information devices that communicate with an external device have been conventionally known (see Japanese Unexamined Patent Application Publication No. 2003-288290 (Patent Literature 1), for example).

The Patent Literature 1 discloses an information device that communicates with a content distribution server for distributing streaming content or other such data. This information device is configured to receive (download) streaming content or other such data from the content distribution server.

In general, with an information device such as that discussed in the Patent Literature 1, an OS (operating system) as software for managing the overall system or a plurality of application programs (hereinafter referred to simply as "applications") are installed.

SUMMARY

With the information device discussed in the Patent Literature 1, depending on the specifications of the OS that is installed, there may be restrictions related to the downloading of data. For example, when the download is performed while an application is running in the background, a specific length of time (a specific restriction time) may be set for performing post-download processing after completing the download. A problem in this case is that depending on the amount of data that is downloaded, it may be impossible for an application to complete the post-download processing within the specific length of time.

This invention is conceived in an effort to solve the above problem, and one object of this invention is to provide an information device with which an application can complete post-download processing even when the download is performed while the application is running in the background.

In view of the state of the known technology and in accordance with a first aspect of the present invention, an information device is provided that comprises a communication component and a controller. The communication component communicates with an external device. The controller downloads video data from the external device through the communication component. The controller executes a post-download processing for playing the video data after completing download of the video data. The controller executes an application for playing the video data. The controller sends a download request for the video data to the external device based on a processing time for the post-download processing.

Also other features, aspects and advantages of the disclosed information device will become apparent to those skilled in the field of manufacturing information device from the following detailed description, which, taken in conjunction with the annexed drawings, discloses several illustrative embodiments of an information device with various features.

BRIEF DESCRIPTION OF THE DRAWINGS

Referring now to the attached drawings which form a part of this original disclosure:

FIG. 8 shows a converted URI and an unconverted URI designated by the information device pertaining to the second embodiment;

FIG. 9 is a seek playback table produced by the information device pertaining to the third embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Configuration of Distribution System

First, the configuration of a distribution system 100 pertaining to the first embodiment will be described through reference to FIG. 1.

Figure 1:
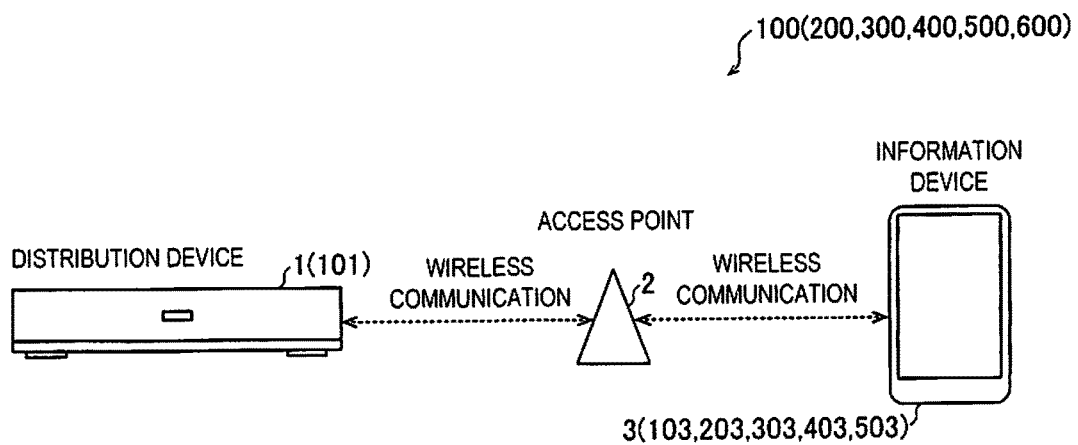
FIG. 1 shows a schematic diagram of a distribution system pertaining to first to sixth embodiments.

As shown in FIG. 1, the distribution system 100 pertaining to the first embodiment comprises a distribution device 1, an access point 2, and an information device 3. With the distribution system 100, the distribution device 1 and the information device 3 are able to communicate wirelessly with each other via the access point 2. The distribution device 1 is an example of the "external device" of the present disclosure. Of course, the connection in the distribution system is not limited to the wireless communication, and can be the wired communication, as needed and/or desired.

The distribution device 1 is a device capable of distributing video data. More specifically, the distribution device 1 is a video recording device capable of recording digital television broadcasts. The distribution device 1 is configured to distribute recorded broadcast programs and broadcast programs that are being viewed, as the video data.

The information device 3 is a device capable of downloading the video data. More specifically, the information device 3 is a smart phone, a tablet PC, or another such portable information device. The information device 3 is configured to download the video data from the distribution device 1. The information device 3 is also configured to play the downloaded video data.

With the distribution system 100, the communication between the distribution device 1 and the information device 3 can be performed, for example, based on DLNA (Digital Living Network Alliance®) technology, or other such technology.

Configuration of Information Device

Figure 2:
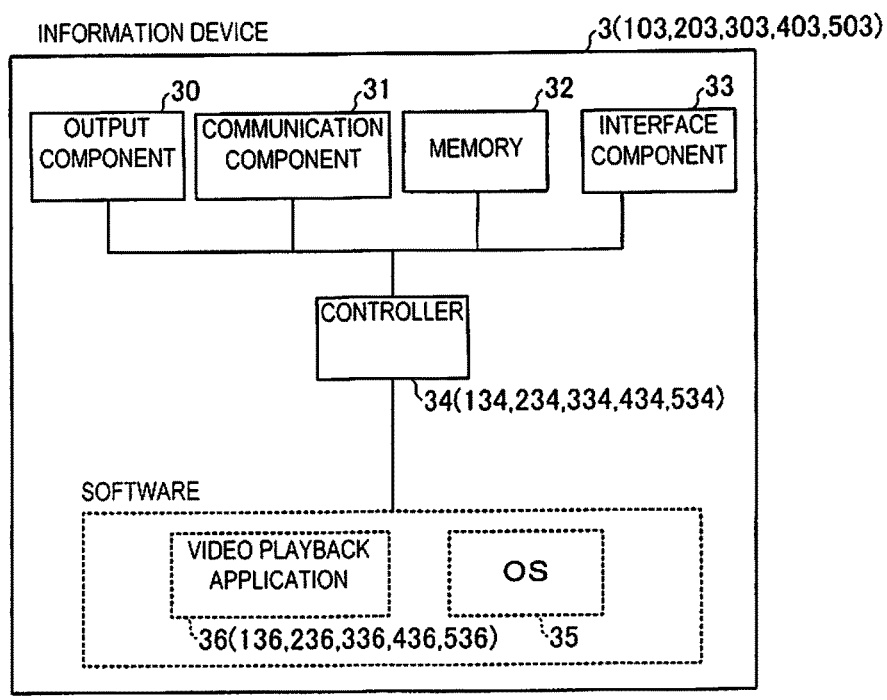
FIG. 2 is a block diagram of the overall configuration of an information device pertaining to the first to sixth embodiments.

As shown in FIG. 2, the information device 3 comprises an output component 30, a communication component 31, a memory 32, an interface component 33, and a controller 34. Also, an OS (operating system) 35 and a video playback application program (hereinafter referred to simply as a "video playback application") 36 are installed in the information device 3. The video playback application 36 is an example of the "application" of the present disclosure.

The output component 30 includes a display component (or display) for the outputting image data part of the video data, and an audio output component (or speaker, earphone jack, and the like) for outputting the audio data part of the video data. The output component 30 is configured to output images and audio when the video data is played. The output component 30 can include suitable configuration that is typically used in information devices. Thus, the output component 30 will not further be discussed herein.

The communication component 31 (or communication circuit) is configured to communicate wirelessly based on a specific standard (such as the IEEE 802.11 standard, and the like). The communication component 31 is also configured to communicate wirelessly with the distribution device 1 via the access point 2. The communication component 31 can include suitable configuration that is typically used in information devices. Thus, the communication component 31 will not further be discussed herein.

The memory 32 is configured to store data. For example, the downloaded video data, the OS 35, the application 36, and other such programs are stored in the memory 32. The memory 32 can include a conventional memory, which is well known in the art, as needed and/or desired. For example, the memory 32 can include a ROM (Read Only Memory) device and/or a RAM (Random Access Memory) device. The RAM can store statuses of operational flags and various data, such as detection results. The ROM can store control programs for various operations of the controller 34.

The interface component 33 (or interface) includes interface buttons, a touch panel, or the like. The interface component 33 is configured so as to receive user input. Thus, the information device 3 is configured to perform operations in response to user input. The interface component 33 can include suitable configuration that is typically used in information devices. Thus, the interface component 33 will not further be discussed herein.

The controller 34 is configured to control the overall operation of the information device 3. The controller 34 is also configured to execute the OS 35, the video playback application 36, and other such programs. The controller 34 includes a CPU (central processing unit), or other processers (microcomputers). The controller 34 can also include other conventional components such as an input interface circuit, an output interface circuit, and storage devices such as an internal ROM device and an internal RAM device. The controller 34 is programmed to control the various component of the power feeder 1. It will be apparent to those skilled in the art from this disclosure that the precise structure and algorithms for controller 34 can be any combination of hardware and software that will carry out the functions of the present invention.

Figure 3:
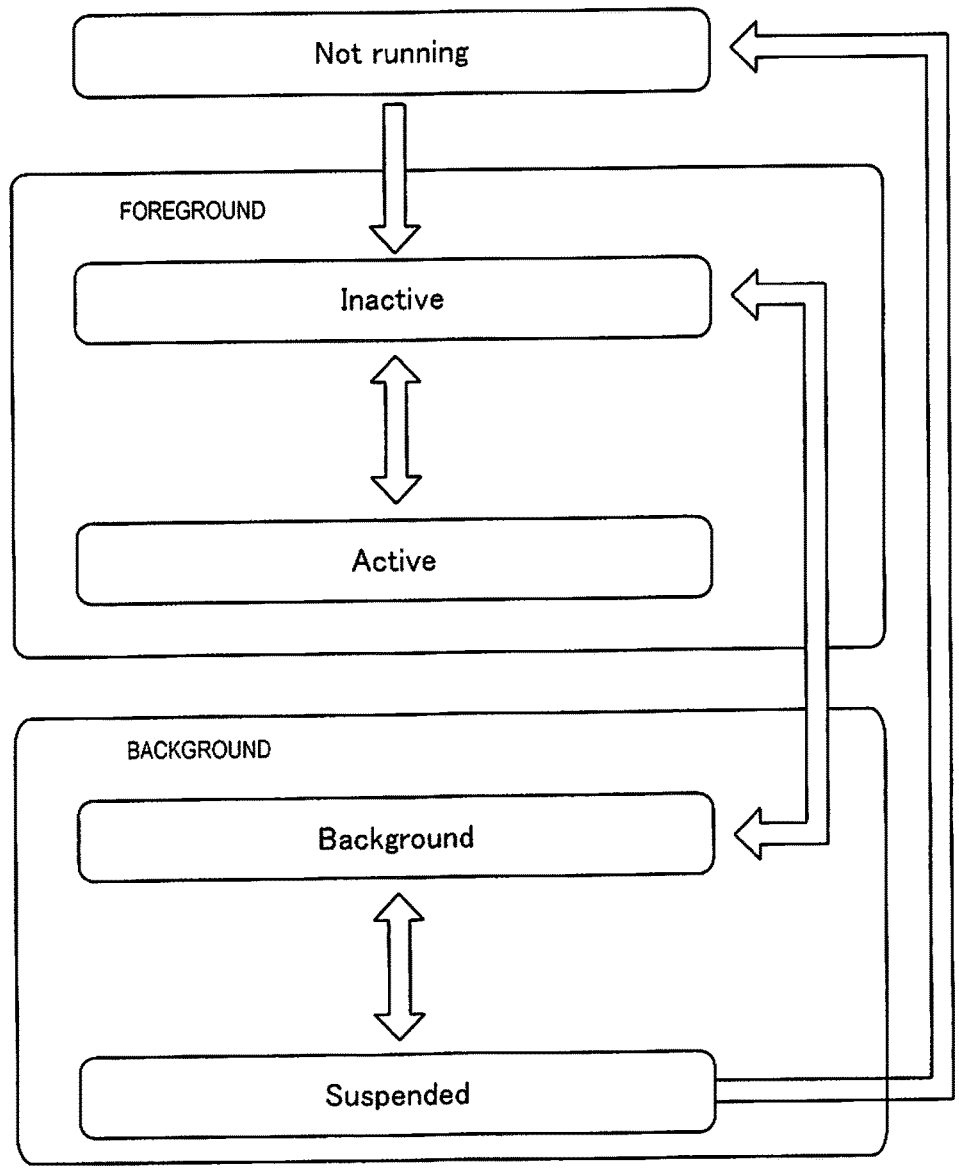
FIG. 3 is a diagram illustrating an application lifecycle of the information device pertaining to the first embodiment.

The OS 35 is a program that manages the overall system within the information device 3. This OS 35 is configured to change the state of the video playback application 36 or other application according to the application lifecycle shown in FIG. 3.

"Not running" is a state in which the application is not running, or was being executed but has now ended.

"Inactive" means a state in which the application is running in the foreground, but is not executing any processing. The term "foreground" means a state in which an interface screen is displayed on the display component of the output component 30, and the application is being used. The OS 35 changes the application from "not running" to "inactive" when the interface component 33 is operated to run the application, for example.

"Active" means a state in which the application is running in the foreground, and is executing processing. The OS 35 changes the application between "inactive" and "active."

"Background" means a state in which the application is running in the background, and is executing processing. Background also means a state in which no interface screen is displayed on the display component of the output component 30, and the application is not being used. The OS 35 changes the application between "inactive" and "background."

"Suspended" means a state in which the application is running in the background, but is not executing any processing. The OS 35 changes or moves the application between "background" and "suspended." Also, the OS 35 changes the application from "suspended" to "not running."

The OS 35 here is configured to change the application from "suspended" to "not running" after the download of video data or other data has been completed, while the application is running in the background ("suspended"). Consequently, the application can perform post-download processing for playing the video data after completing download of the video data on the downloaded video data.

Also, the OS 35 is configured to forcibly change the application from "background" to "suspended" when processing in "background" is not completed within a specific length of time (a specific time limit) (30 seconds, for example) after the completion of the download of video data or other data. In this case, processing is not executed by the application if "suspended," so the application cannot complete the post-download processing.

The video playback application 36 is an application for playing video data. More specifically, the video playback application 36 is configured to be able to download video data from the distribution device 1 via the communication component 31, and to play the downloaded video data.

Figure 4:
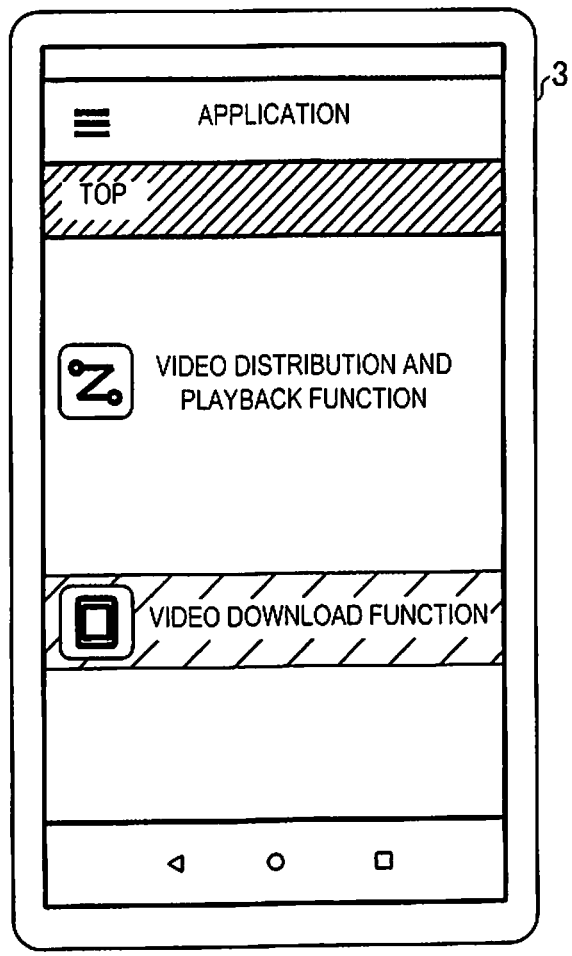
FIG. 4 is a diagram illustrating a function of the application in the information device pertaining to the first embodiment.

As shown in FIG. 4, the video playback application 36 is also an application having a video distribution and playback function and a video download function.

The video distribution and playback function of the video playback application 36 is a function of successively playing video data (called streaming) while downloading it from the distribution device 1.

The video download function of the video playback application 36 is a function of downloading video data from the distribution device 1, and then playing the downloaded video data. The user can view the video data by selecting either the video distribution and playback function or the video download function as needed. In the first embodiment, the description will focus on when the video download function is used.

Figure 5:
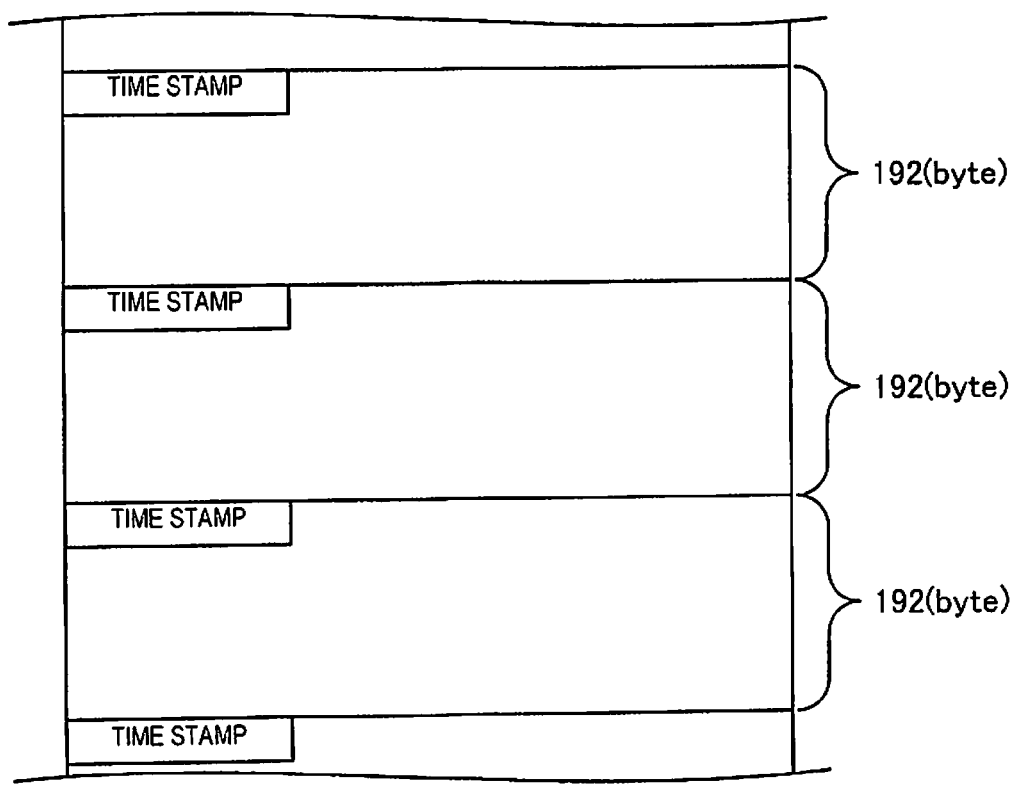
FIG. 5 is a diagram illustrating TS files (video data) downloaded by the information device pertaining to the first embodiment.

As shown in FIG. 5, the video playback application 36 is configured to download video data (TS files) stored in MPEG2-TS (transport stream) format in the distribution device 1.

Figure 6:
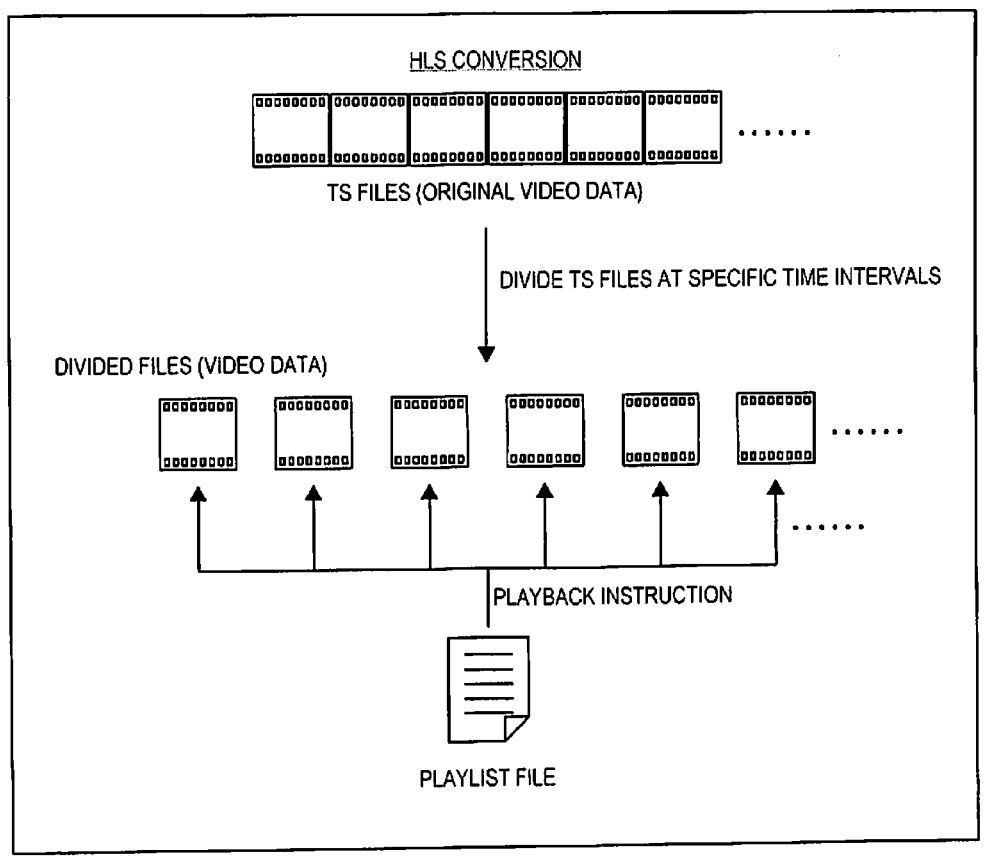
FIG. 6 is a diagram illustrating HLS conversion processing by the information device pertaining to the first embodiment.

As shown in FIG. 6, the video playback application 36 is configured to convert the downloaded video data into HLS (HTTP live streaming) format that is playable in the information device 3.

More specifically, the video playback application 36 is configured to convert the format of the video data into the HLS format (e.g., playable format) by producing a plurality of divided files that have been divided at specific time intervals (such as intervals of 10 seconds), and a playlist file (e.g., playlist) for playback instructions of divided files, based on the downloaded video data.

As shown in FIG. 5, the video data (TS files) are time stamped every 192 bytes. Thus, the video playback application 36 is configured to analyze the time stamps of the downloaded video data, and to produce a plurality of divided files and a playlist file based on the analyzed time stamps.

The video playback application 36 is also configured to play the video data that has been converted into the HLS format (a plurality of divided files and a playlist file). More specifically, the video playback application 36 is configured to play the video data that has been converted into the HLS format by designating the divided files to be played, based on the playlist file. In other worlds, the controller 34 is configured to execute the video playback application 36 to play the video data by designating the divided files based on the playlist file.

If the video playback application 36 has completed the download of the video data (TS files) while the video playback application 36 is "suspended" (see FIG. 3), then the OS 35 changes the video playback application 36 from "suspended" to "background." After this, processing to convert the downloaded video data into the HLS format (hereinafter referred to as "HLS conversion processing") is performed by the video playback application 36. Here, if the HLS conversion processing is not completed within the specific length of time that is set by the specification of the OS 35, the video playback application 36 is forcibly changed from "background" to "suspended." This creates a problem in that the HLS conversion processing is halted and the video playback application 36 cannot complete the HLS conversion processing after completing download of the video data (TS files). The HLS conversion processing is an example of the "post-download processing" of the present disclosure.

Configuration of Controller Pertaining to Video Data Download

In view of this, in the first embodiment, the controller 34 (the video playback application 36) is configured to send a download request to the distribution device 1 for the video data (TS files) again if the HLS conversion processing is not completed within the specific length of time while the video playback application 36 is running in the background.

Here, the controller 34 is configured to repeat sending this download request for the video data until the HLS conversion processing is complete.

Also, in the first embodiment, the controller 34 is configured to request part of the video data from the distribution device 1 when the download request for the video data is sent again to the distribution device 1. More specifically, the controller 34 is configured to designate a byte range for the part of the video data (such as a byte range from the start of the video data to 20 MB, for example) and to request data within the designated byte range. Thus, in the illustrated embodiment, the controller 34 is configured to send the download request for the part of the video data to the distribution device (e.g., external device) by specifying the data range of the part in the video data. For example, the controller 34 is configured to repeat sending the download request for the same part of the video data (such as a byte range from the start of the video data to 20 MB, for example) to the distribution device 1. The controller 34 is also configured to delete the downloaded video data (data within the designated byte range) that is downloaded in response to the download request for the video data being sent again.

Video Download Processing

The video download processing performed in the first embodiment will now be described through reference to the sequence diagram in FIG. 7. In the video download processing, the operation of the OS 35 and the video playback application 36 is executed by the controller 34.

Figure 7:
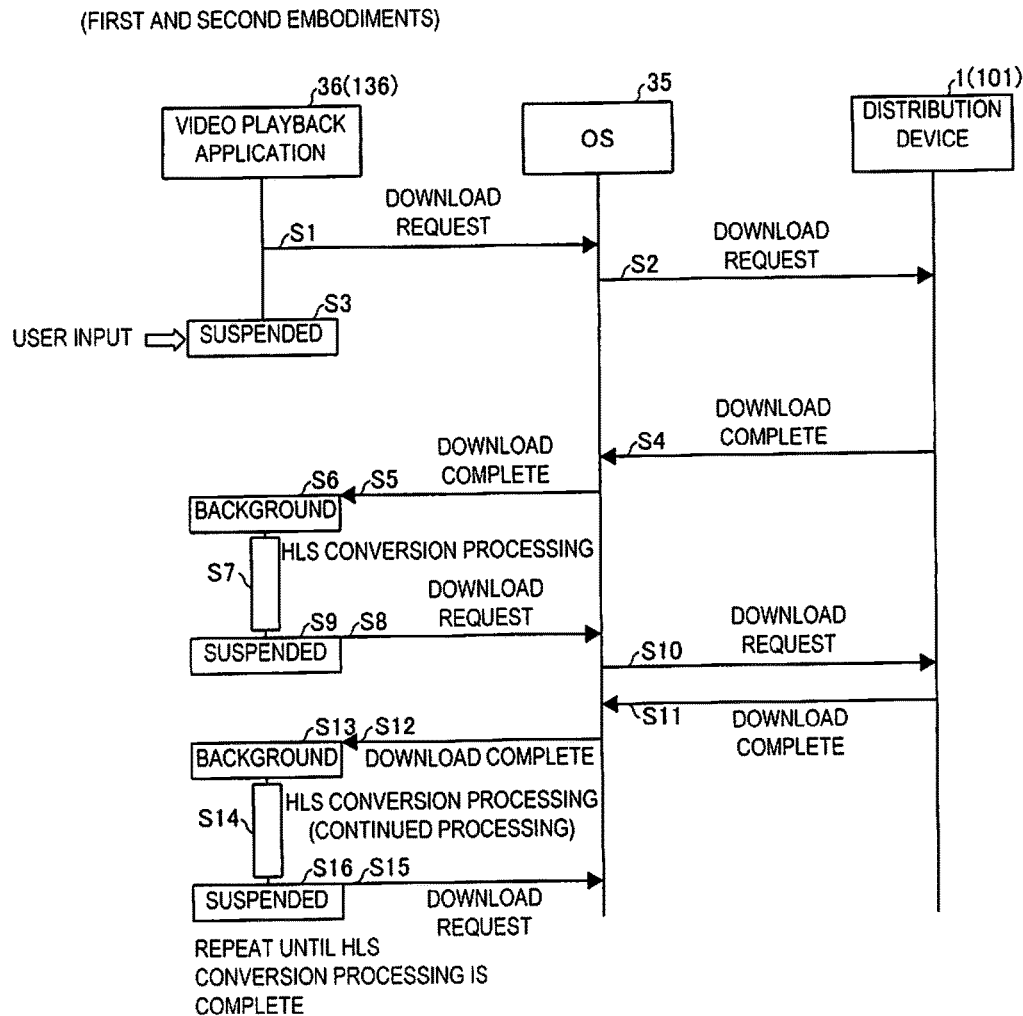
FIG. 7 is a sequence diagram illustrating video download processing by the information device pertaining to the first and second embodiments.

As shown in FIG. 7, in step S1 a download request for downloading video data (TS files) from the distribution device 1 is sent from the video playback application 36 to the OS 35.

Then, in step S2, the download request is sent from the OS 35 to the distribution device 1. As a result, the video data (TS files) is downloaded from the distribution device 1.

Then, in step S3, user operation of the interface component 33 changes the video playback application 36 to "suspended."

After this, in step S4, the distribution device 1 notifies the OS 35 that the download is complete. In response, the controller 34 (the OS 35) starts measuring time to determine if the specific length of time has elapsed after completing the download. As mentioned above, the OS 35 forcibly changes the video playback application 36 from "background" to "suspended" when the specific length of time has elapsed (see step S9).

Then, in step S5, the OS 35 notifies the video playback application 36 that the download is complete.

Then, in step S6, the OS 35 changes the video playback application 36 from "suspended" to "background."

Then, in step S7, the HLS conversion processing is performed to convert the downloaded video data into the HLS format. That is, a plurality of divided files and a playlist file are produced based on the downloaded video data (TS files).

If the HLS conversion processing is not completed within the specific length of time after completing download of the video data, then the HLS conversion processing is halted. Specifically, the controller 34 determines if the HLS conversion processing is complete within the specific length of time after completing download of the video data (step S4). More specifically, the controller 34 can determine that the HLS conversion processing is not completed within the specific length of time by determining that the HLS conversion processing is not completed when a preset time, which is shorter than the specific length of time, has elapsed after the controller 34 (the OS 35) starts measuring time (step S4). Of course, the controller 34 can determine if the HLS conversion processing is complete within the specific length of time in a different manner. If the controller determines that the HLS conversion processing is not completed within the specific length of time, then, in step S8, the video playback application 36 sends a download request again to the OS 35. Here, only part of the video data (TS files) is requested by the video playback application 36 to the OS 35 by designating the byte range. The download request in step S8 is performed within the specific length of time after completing download of the video data (step S4). In other words, this download request in step S8 is performed before the OS 35 forcibly changes the video playback application 36 from "background" to "suspended."

Then, in step S9, once the specific length of time has elapsed, the OS 35 changes the video playback application 36 from "background" to "suspended."

Then, in step S10, the download request is sent again from the OS 35 to the distribution device 1. For example, the download request for the part of the video data is again sent by designating the byte range.

After this, in step S11, the distribution device 1 again notifies the OS 35 that the download is complete. In response, the controller 34 (the OS 35) again starts measuring time to determine if the specific length of time has elapsed after completing this download.

Then, in step S12, the OS 35 again notifies the video playback application 36 that the download is complete.

Then, in step S13, the OS 35 again changes the video playback application 36 from "suspended" to "background."

Then, in step S14, the processing is performed to continue the HLS conversion processing that is halted prior to step S8 (the processing in step S7). Specifically, the production of a plurality of divided files and a playlist file is continued based on the video data (TS files) downloaded in steps S1 to S5. The video data that is downloaded again in steps S8 to S12 is deleted without being used in processing. Thus, in the illustrated embodiment, the controller 34 is configured to halt the HLS conversion processing (post-download processing) when the HLS conversion processing is not completed within the specific length of time (steps S7 and S8, for example). The controller 34 also is configured to continue the HLS conversion processing (post-download processing) (step S14) when the download of the video data is complete in response to the download request (steps S8 and S12, for example).

Then, in step S14, if the HLS conversion processing is not completed within the specific length of time, the HLS conversion processing is halted. Here, the controller 34 again determines if the HLS conversion processing is complete within the specific length of time after completing download of the video data (step S11) in a manner same as in step S7. Then, in step S15, a download request is sent again from the video playback application 36 to the OS 35. Here again, the video playback application 36 requests the part of the video data (TS files) from the OS 35. The video playback application 36 can request the same part of the video data as the part requested in step S8. Of course, the video playback application 36 can request different part of the video data from the part requested in step S8.

Then, in step S16, the OS 35 changes the video playback application 36 from "background" to "suspended."

After this, the same processing as that in steps S8 to S14 is repeated until the HLS conversion processing is complete.

Effect of First Embodiment

The following effect is obtained with the first embodiment.

As discussed above, in the first embodiment, the controller 34 executes the post-download processing for playing the video data (the HLS conversion processing) after completing download of the video data. The controller 34 sends the download request to the distribution device 1 for the video data based on a processing time for the post-download processing. Specifically, the controller 34 sends the download request to the distribution device 1 for the video data again if the post-download processing (the HLS conversion processing) is not completed within the specific length of time, while the video playback application 36 is running in the background. Consequently, since the video data can be downloaded again, the processing can be started again in the background after the download in response to the download request is complete. As a result, the specific length of time can be substantially extended. Thus, even when the download is performed while the video playback application 36 is running in the background, the video playback application 36 can complete the post-download processing (the HLS conversion processing). This is particularly effective with a large amount of video data that tends to take a long time for the post-download processing.

Also, in the first embodiment, as discussed above, the processing to convert the format of the video data to the playable HLS format is performed as the post-download processing. Consequently, the processing to convert the format of the video data into the playable HLS format can be completed even if the download is performed while the video playback application 36 is running in the background.

Also, in the first embodiment, as discussed above, the controller 34 is configured to request only part of the video data from the distribution device 1 when a download request for the video data (subsequent download request after an initial download request in step S1) is again sent to the distribution device 1. Consequently, the time it takes for the download can be shorter than when all of the video data is requested. As a result, it will take less time for the video playback application 36 to complete the post-download processing (the HLS conversion processing). Therefore, even when the download request for the video data is again sent to the distribution device 1, this avoids an increase in the processing load on the controller 34.

In the illustrated embodiment, the information device 3 comprises the controller 34. The controller 34 downloads the video data from the distribution device 1 via the communication component 31. The controller 34 executes the video playback application 36 that plays the downloaded video data. The controller 34 is configured to send the download request for the video data again to the distribution device 1 when the post-download processing for playing the video data after completing download of the video data is not completed within the specific length of time, while the video playback application 36 is running in the background.

Second Embodiment

A second embodiment will now be described through reference to FIGS. 1, 2, 7, and 8. In this second embodiment, in addition to the configuration of the first embodiment discussed above, the video data is downloaded while the format of the video data is converted by a distribution device.

Configuration of Distribution System

As shown in FIG. 1, a distribution system 200 pertaining to the second embodiment differs from the distribution system 100 in the first embodiment in that it comprises a distribution device 101 and an information device 103. As shown in FIG. 2, the information device 103 differs from the information device 3 in the first embodiment in that it comprises a controller 134 and a video playback application 136. Those components that are the same as in the first embodiment will be numbered the same and will not be described again. The distribution device 101 is an example of the "external device" of the present disclosure. Also, the video playback application 136 is an example of the "application" of the present disclosure.

Configuration of Distribution Device

The distribution device 101 is configured to distribute the video data while converting the format of the video data. More specifically, the distribution device 101 is configured as a video recording device that distributes the video data while converting video data in a DR (direct recording) format into video data in an AVC (advanced video coding) recording format. Of course, these formats are merely illustration only, and can be different from the formats described above.

Here, when the video data is downloaded while the format of the video data is converted by the distribution device 101, all of the converted data is not produced in advance. Thus, there will be times when it is impossible to request part of the video data from the distribution device 101 (request data by designating the byte range).

Configuration of Controller of Information Device Pertaining to Video Data Download In view of this, in the second embodiment, the controller 134 (the video playback application 136) of the information device 103 is configured to request the video data in the pre-conversion format to the distribution device 101 when another download request for the video data is sent to the distribution device 101, and when the video data whose format is converted by the distribution device 101 during download of the video data is downloaded through the communication component 31.

More specifically, as shown in FIG. 8, the controller 134 is configured to request the video data in the pre-conversion format to the distribution device 101 by designating the URI (uniform resource identifier) that requests video data in the pre-conversion format (unconverted URI), rather than the URI that requests video data in the post-conversion format (converted URI).

Video Download Processing

The video download processing pertaining to the second embodiment will now be described through reference to FIG. 7. The description here will be of what is different from the first embodiment given above, and redundant description will be omitted.

In the second embodiment, in step S1 in FIG. 7, a download request for video data while converting the format is sent from the video playback application 136 to the OS 35 by designating the converted URI (see FIG. 8). As a result, in steps S1 to S5 the converted video data (video data that has been converted to AVC recording format) is downloaded from the distribution device 101.

Also, in step S8 (S15) in FIG. 7, another download request for pre-conversion video data is sent from the video playback application 136 to the OS 35 by designating the unconverted URI (see FIG. 8). Here, part of the video data (TS files) is requested by designating the byte range in a manner described above. As a result, in steps S8 to S12, pre-conversion video data (video data in the DR format) is downloaded from the distribution device 101.

The rest of the configuration of the second embodiment is the same as in the first embodiment above.

Effect of Second Embodiment

The following effect is obtained with the second embodiment.

As discussed above, in the second embodiment, the controller 134 is configured to send the download request for the video data in the pre-conversion format to the distribution device 101 when the video data whose format is converted by the distribution device 101 during download of the video data is downloaded via the communication component 31. Consequently, part of the video data can be requested from the distribution device 101 even when the video data is downloaded while its format is converted by the distribution device 101.

The rest of the effect of the second embodiment is the same as in the first embodiment above.

Third Embodiment

A third embodiment will now be described through reference to FIGS. 1, 2, 9, and 10. In this third embodiment, a seek playback table is produced as post-download processing after completing download of the video data, as opposed to the first embodiment above in which the HLS conversion processing is performed as the post-download processing.

Configuration of Distribution System

As shown in FIG. 1, a distribution system 300 pertaining to the third embodiment differs from the distribution system 100 in the first embodiment in that it comprises an information device 203. As shown in FIG. 2, the information device 203 differs from the information device 3 in the first embodiment in that it comprises a controller 234 and a video playback application 236. Those components that are the same as in the first embodiment will be numbered the same and will not be described again. The video playback application 236 is an example of the "application" in the present disclosure.

Configuration of Video Playback Application

In the first embodiment, the HLS conversion processing is performed after completing download of the video data. On the other hand, in the third embodiment, the video playback application 236 is configured to perform processing to produce the seek playback table after completing download of the video data (hereinafter referred to as "seek playback table production processing"), as shown in FIG. 9. This seek playback table is an example of the "seek playback data" or the "playback data" in the present disclosure.

The seek playback table is data for seek playback in which a playback location in the video data is designated for playback. The seek playback table is also data in which the playback time (in seconds) of the video data and the data volume (in bytes) of the video data are associated with each other. In FIG. 9, the seek playback table has data in which the playback time (in seconds) of the video data and the data volume (in bytes) of the video data are associated with each other in one-second time intervals.

The video playback application 236 is configured to produce the seek playback table in which the playback time (in seconds) of the video data and the data volume (in bytes) of the video data are associated with each other by analyzing the time stamps of the video data (see FIG. 5), based on bit rate (bytes per second) information for the video data.

Configuration of Controller of Information Device Pertaining to Video Data Playback In the third embodiment, unlike in the first embodiment, the HLS conversion processing is not performed as the post-download processing. Therefore, in the third embodiment, the controller 234 (the video playback application 236) is configured to play the video data while the downloaded video data is converted to the HLS format in the playback of the video data.

Here, the controller 234 is configured to specify the playback location in the video data based on the seek playback table when the user has designated the playback location by using the interface component 33. More specifically, the controller 234 is configured to convert the playback location (playback time) designated by the user with the interface component 33 into the data volume of the video data corresponding to this playback location. The controller 234 is also configured to specify the playback location in the video data based on the data volume of the converted video data. Also, the controller 234 is configured to play the video data while converting the video data into the HLS format from the specified playback location if the playback location has been specified.

Configuration of Controller of Information Device Pertaining to Video Data Download Also, in the third embodiment, the controller 234 is configured to send a download request for video data (TS files) again from the video playback application 236 to the distribution device 1 if the seek playback table production processing is not completed within the specific length of time, while the video playback application 236 is running in the background.

Here, the controller 234 is configured to repeat the download request for the video data by the video playback application 236 until the seek playback table production processing is complete.

Video Download Processing

The video download processing performed in the third embodiment will now be described through reference to the sequence diagram in FIG. 10. In the video download processing, the operation of the OS 35 and the video playback application 236 is executed by the controller 234. Processing that is the same as the video download processing in the first embodiment will be numbered the same and will not be described again.

Figure 10:
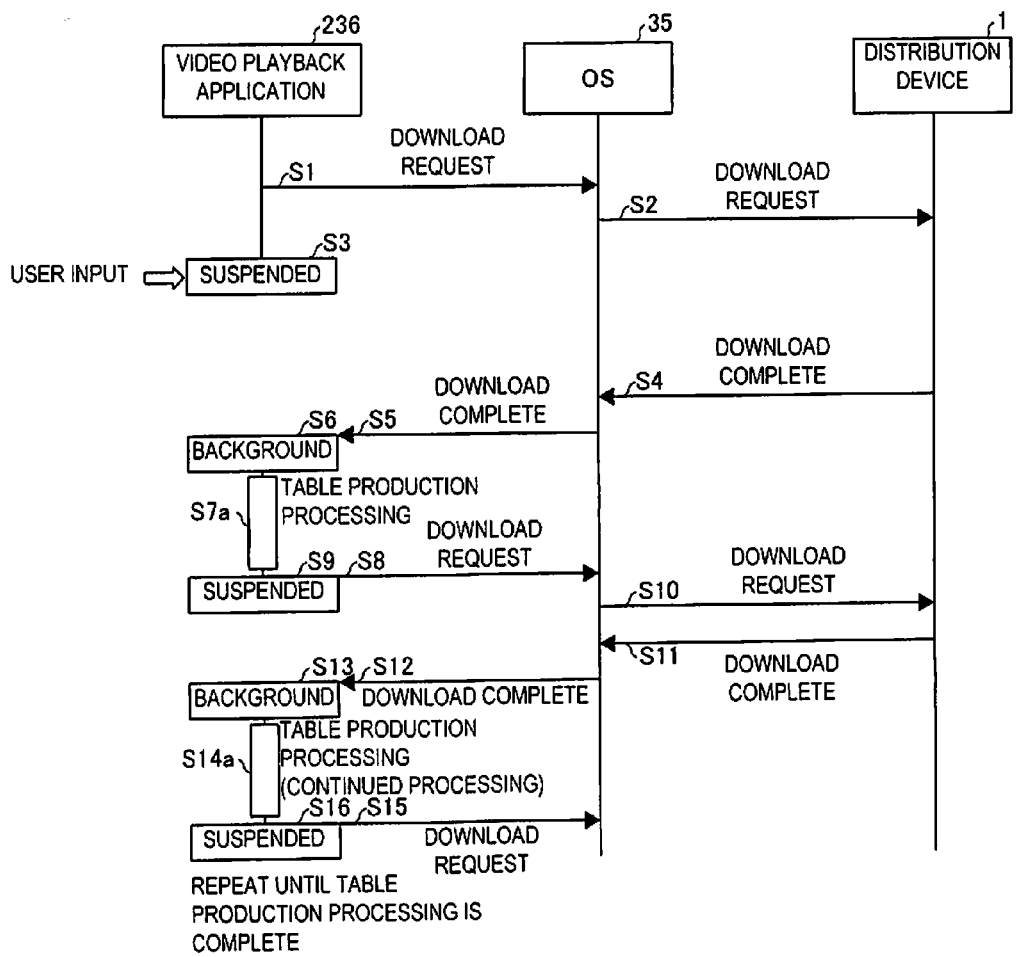
FIG. 10 is a sequence diagram illustrating video download processing by the information device pertaining to the third embodiment.

As shown in FIG. 10, in steps S1 to S6, the same processing is performed as in the first embodiment above.

Then, in step S7a, seek playback table production processing is performed for producing a seek playback table. That is, the seek playback table in which the playback time (in seconds) of the video data and the data volume (in bytes) of the video data are associated with each other is produced by analyzing the time stamps of the video data based on bit rate information for the video data.

If the seek playback table production processing is not completed within the specific length of time, the seek playback table production processing is halted. Also, in step S8, the video playback application 236 sends another download request to the OS 35. Here, the video playback application 236 requests part of the video data (TS files) from the OS 35 by designating the byte range. The download request in step S8 is performed within the specific length of time.

Then, in steps S9 to S13, the same processing as in the first embodiment is performed.

Then, in step S14a, the processing is performed to continue the seek playback table production processing that is halted prior to step S8. Specifically, the production of the seek playback table is continued by analyzing the time stamps of the video data based on the bit rate information for the video data (TS files) downloaded in steps S1 to S5. The video data that has been downloaded again in steps S8 to S12 is deleted without being used in the processing.

Then, in step S14a, if the seek playback table production processing has not been completed within the specific length of time, then the seek playback table production processing is halted again. Then, in step S15, the download request is sent from the video playback application 236 to the OS 35 again. Here again, the video playback application 236 requests part of the video data (TS files) from the OS 35.

Then, in step S16, the OS 35 changes the video playback application 36 from "background" to "suspended."

After this, the same processing as in steps S8 to S14a is repeated until the seek playback table production processing is complete.

The rest of the configuration of the third embodiment is the same as in the first embodiment above.

Effect of Third Embodiment

The following effect is obtained with the third embodiment.

As discussed above, in the third embodiment, the controller 234 is provided to send the download request to the distribution device 1 for the video data again when the post-download processing (seek playback table production processing) is not completed within the specific length of time while the video playback application 236 is running in the background. Consequently, since the video data can be downloaded again, the processing in the background can be started after the download is complete. As a result, the specific length of time can be substantially extended. Thus, the video playback application 236 can complete the post-download processing (seek playback table production processing) even when the download is performed while the video playback application 236 is running in the background. This is particularly effective with a large amount of video data that tends to take a long time for the post-download processing.

Also, in the third embodiment, as discussed above, the processing to produce the seek playback table for the seek playback, in which a playback location in the video data is designated for playback, is performed as the post-download processing. Consequently, the processing to produce the seek playback table can be completed even when the download is performed while the video playback application 236 is running in the background. Also, no complicated processing is required for the processing to produce the seek playback table (data). Thus, the processing will take less time than the processing to convert the format of the video data into the HLS format. As a result, it will take less time for the video playback application 236 to complete the post-download processing. Thus, even when the download request for the video data is sent again to the distribution device 1, this avoids an increase in the processing load on the controller 234.

The rest of the effect of the third embodiment is the same as in the first embodiment above.

Fourth Embodiment

A fourth embodiment will now be described through reference to FIGS. 1, 2, 11, and 12. In this fourth embodiment, unlike in the third embodiment above in which a playback location in video data is specified based on a seek playback table, a playback location in video data is specified based on downloaded video data and a seek playback table.

Configuration of Distribution System

As shown in FIG. 1, a distribution system 400 pertaining to the fourth embodiment differs from the distribution system 300 in the third embodiment in that it comprises an information device 303. As shown in FIG. 2, the information device 303 differs from the information device 203 in the third embodiment in that it comprises a controller 334 and a video playback application 336. Those components that are the same as in the third embodiment will be numbered the same and will not be described again. The video playback application 336 is an example of the "application" of the present disclosure.

Configuration of Video Playback Application

Figures 11, 12:
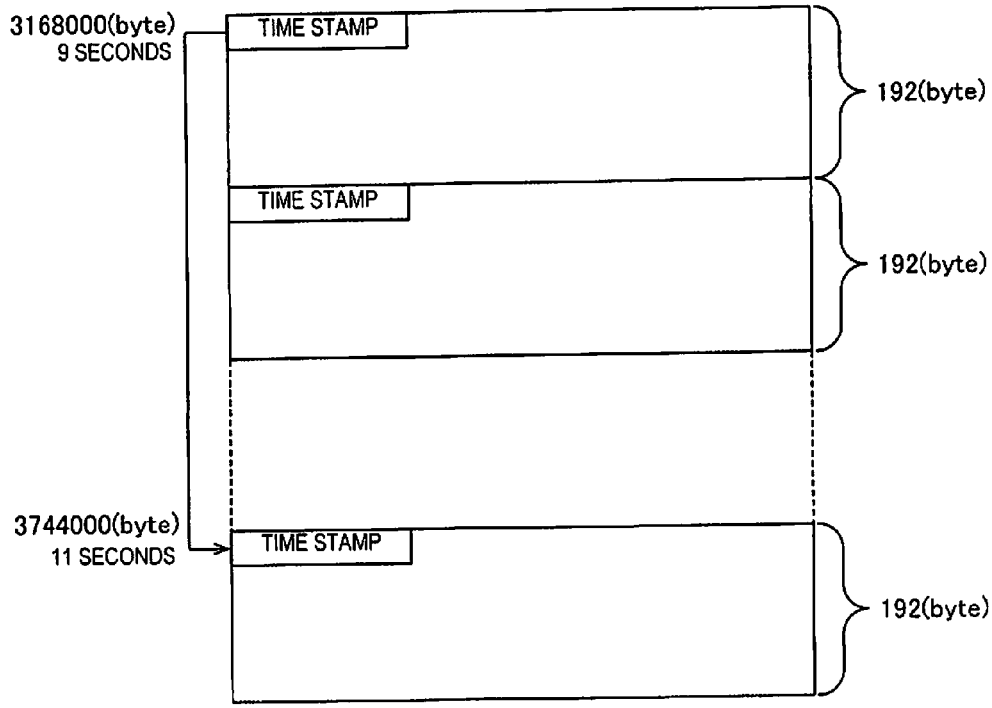
FIG. 11 is a seek playback table produced by the information device pertaining to the fourth embodiment.
FIG. 12 is a diagram illustrating processing for specifying the playback location of the information device pertaining to the fourth embodiment.

With the video playback application 236 in the third embodiment, a seek playback table is produced in which the playback time (in seconds) of the video data and the data volume (in bytes) are associated with each other in one-second time intervals. As shown in FIG. 11, unlike the video playback application 236 in the third embodiment, the video playback application 336 is configured to produce a seek playback table in which the playback time (in seconds) of the video data and the data volume (in bytes) of the video data are associated with each other in three-second time intervals, which is greater than one second.

Configuration of Controller of Information Device Pertaining to Video Data Playback In the fourth embodiment, the controller 334 (the video playback application 336) is configured to specify a playback location in the video data based on the downloaded video data (TS files) and the seek playback table.

For instance, if a time point of "11 seconds" is designated as the playback location, the controller 334 specifies the data volume corresponding to a time point of "9 seconds," which is a time point close to the time point "11 seconds," based on the seek playback table. As mentioned above, the seek playback table stores corresponding relationships between the playback time and the data volume in three-second time interval. Thus, the controller 334 can determine the data volume corresponding to the time point of "9 seconds" based on the seek playback table. Here, the time point of "9 seconds" have been chosen since the time point of "9 seconds" is the closest time point stored in the seek playback table within the designated time point of "11 seconds". After this, the controller 334 specifies the playback location of "11 seconds" by analyzing the time stamps of the downloaded video data (TS files) from the position close to the specified data volume. Of course, in the illustrated embodiment, the time point in the seek playback table can be chosen in a different manner. For example, the time point of "12 seconds" can be chosen as the closest time point in the seek playback table to the designated time point of "11 seconds", and the time stamps of the downloaded video data can be analyzed backward.

The rest of the configuration of the fourth embodiment is the same as in the third embodiment above.

Effect of Fourth Embodiment

The following effect is obtained with the fourth embodiment.

With the fourth embodiment, as discussed above, when the seek playback table is produced, the controller 334 is configured to specify the playback location in the video data based on the downloaded video data and the seek playback table. Consequently, the playback location can be specified more accurately than when the playback location in the video data is specified only based on the seek playback table.

Also, in the fourth embodiment, as discussed above, the controller 334 is configured to produce the seek playback table in which the playback time (in seconds) of the video data and the data volume (in bytes) of the video data are associated with each other in three-second time intervals, which is greater than one second. Consequently, it will take less time for the video playback application 336 to complete the post-download processing (seek playback table production processing). Thus, even when the download request for the video data is sent again to the distribution device 1, this avoids an increase in the processing load on the controller 334.

The rest of the effect of the fourth embodiment is the same as in the third embodiment above.

Fifth Embodiment

A fifth embodiment will now be described through reference to FIGS. 1, 2, and 13. In this fifth embodiment, in addition to the configuration of the third embodiment above, a download request is performed even when the video playback application is changed or moved from the foreground to the background.

Configuration of Distribution System

As shown in FIG. 1, the distribution system 500 pertaining to the fifth embodiment differs from the distribution system 300 in the third embodiment in that it comprises an information device 403. As shown in FIG. 2, the information device 403 differs from the information device 203 in the third embodiment in that it comprises a controller 434 and a video playback application 436. Those components that are the same as in the third embodiment will be numbered the same and will not be described again. The video playback application 436 is an example of the "application" of the present application.

Figure 13:
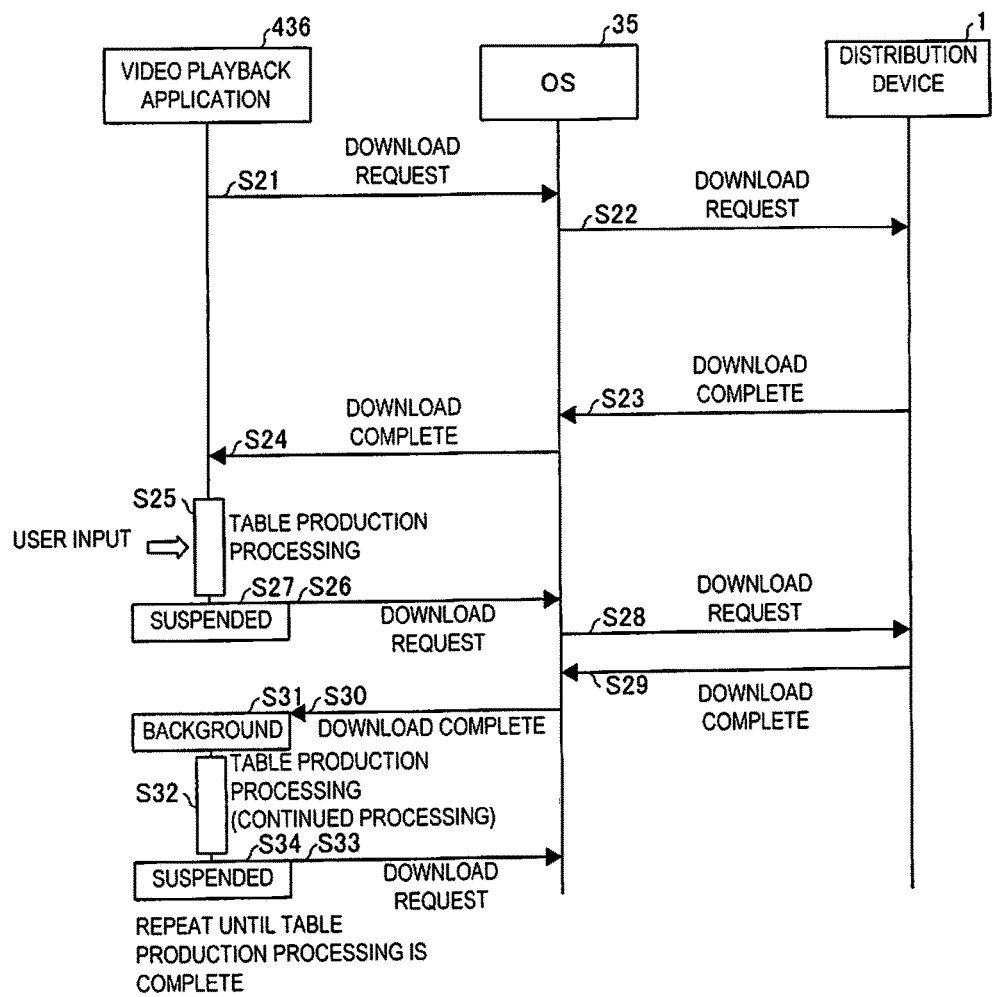
FIG. 13 is a sequence diagram illustrating video download processing by the information device pertaining to the fifth embodiment.

Configuration of Controller of Information Device Pertaining to Video Data Download In the fifth embodiment, as shown in FIG. 13, the controller 434 (the video playback application 436) is configured to send a download request for video data to the distribution device 1 again when the video playback application 436 has changed or moved from the foreground to the background while the seek playback table production processing is being performed, in addition to when the seek playback table production processing is not completed within the specific length of time.

Video Download Processing

The video download processing performed in the fifth embodiment will now be described through reference to the sequence diagram in FIG. 13. In the video download processing, the operation of the OS 35 and the video playback application 436 is executed by the controller 434. Steps S21 to S24 in FIG. 13 are basically similar to steps S1, S2, S4 and S5 in FIG. 10, respectively, and steps S26 and S28 to S34 in FIG. 13 are basically similar to steps S8, S10 to S13, S14a, S15 and S16, respectively. Thus, detailed description will be omitted for the sake of brevity.

As shown in FIG. 13, in step S21, the download request is sent from the video playback application 436 to the OS 35 to download the video data (TS files) from the distribution device 1.

Then, in step S22, the download request is sent from the OS 35 to the distribution device 1.

Then, in step S23, the distribution device 1 notifies the OS 35 that the download is complete.

Then, in step S24, the OS 35 notifies the video playback application 436 that the download is complete.

Then, in step S25, the seek playback table production processing is performed to produce a seek playback table. The seek playback table is produced by analyzing the time stamps of the video data based on bit rate information for the video data. In the seek playback table, the playback time (in seconds) of the video data and the data volume (in bytes) of the video data are associated with each other.

If, in the middle of the processing of step S25, the user operates the interface component 33, such as a home button, to change or move the video playback application 436 from the foreground to the background, then the processing of step S25 is halted. Furthermore, in step S26, the download request is again sent from the video playback application 436 to the OS 35. Here, the video playback application 436 requests part of the video data (TS files) from the OS 35 by designating the byte range. Also, when the user operates the interface component 33 to change or move the video playback application 436 from the foreground to the background, the seek playback table production processing is halted prior to step S26.

Then, in step S27, the video playback application 436 is changed by the OS 35 to "suspended." For example, the video playback application 436 is changed by the OS 35 to "suspended" when a short time period (e.g., 5 seconds) has elapsed after the user operates the interface component 33. The download request in step S26 is performed before the video playback application 436 is changed to "suspended." In other words, the download request in step S26 is performed before the short time period (e.g., 5 seconds) has elapsed after the user operates the interface component 33.

Then, in step S28, the OS 35 sends the download request to the distribution device 1 again.

After this, in step S29, the distribution device 1 again notifies the OS 35 that the download is complete.

Then, in step S30, the OS 35 again notifies the video playback application 436 that the download is complete.

Then, in step S31, the OS 35 again changes the video playback application 436 from "suspended" to "background."

Then, in step S32, the processing is performed to continue the seek playback table production processing that is halted prior to step S26. Specifically, the production of the seek playback table is continued by analyzing the time stamps of the video data based on the bit rate information for the video data (TS files) downloaded in steps S21 to S24. The video data downloaded again in steps S26 to S30 is deleted without being used in the processing.

Then, in step S32, if the seek playback table production processing is not completed within the specific length of time, then the seek playback table production processing is halted. Then, in step S33, another download request is sent from the video playback application 436 to the OS 35. Here again, the video playback application 436 requests part of the video data (TS files) from the OS 35.

Then, in step S34, the OS 35 changes the video playback application 436 from "background" to "suspended."

After this, the same processing as in steps S26 to S32 is repeated until the seek playback table production processing is complete.

The rest of the configuration of the fifth embodiment is the same as in the third embodiment above.

Effect of Fifth Embodiment

The following effect is obtained with the fifth embodiment.

As discussed above, in the fifth embodiment, the controller 434 is configured to send the download request of the video data again to the distribution device 1 even when the video playback application 436 has been changed from the foreground to the background while the post-download processing (seek playback table production processing) is being performed. Here, if the video playback application 436 has been changed from the foreground to the background while the post-download processing (seek playback table production processing) is being performed, then the post-download processing is halted. Thus, there may be times when the post-download processing cannot be completed. In view of this, with the above configuration, the video data can be downloaded again even if the video playback application 436 has been changed from the foreground to the background. Thus, the post-download processing in the background can be restarted after completing download. As a result, the video playback application 436 can continue the post-download processing in the specific length of time that has newly started. Thus, the video playback application 436 can complete the post-download processing (seek playback table production processing) even if the video playback application 436 has been changed or moved from the foreground to the background while the post-download processing is being performed.

The rest of the effect of the fifth embodiment is the same as in the third embodiment above.

Sixth Embodiment

A sixth embodiment will now be described through reference to FIGS. 1, 2, 4, and 14. In this sixth embodiment, in addition to the configuration of the third embodiment above, other processing that is different from the seek playback table production processing is further performed after completing the seek playback table production processing.

Configuration of Distribution System

As shown in FIG. 1, the distribution system 600 pertaining to the sixth embodiment differs from the distribution system 300 in the third embodiment in that it comprises an information device 503. As shown in FIG. 2, the information device 503 differs from the information device 203 in the third embodiment in that it comprises a controller 534 and a video playback application 536. Those components that are the same as in the third embodiment will be numbered the same and will not be described again. The video playback application 536 is an example of the "application" of the present disclosure.

Configuration of Controller of Information Device

In the sixth embodiment, the controller 534 (the video playback application 536) is configured to send a download request for video data to the distribution device 1 again when the seek playback table production processing is not completed within the specific length of time after completing download of the video data in a manner described above. In addition to that, the controller 534 (the video playback application 536) is also configured to send another download request for video data to the distribution device 1 to further perform other processing that is different from the seek playback table production processing when the seek playback table production processing is complete.

Figure 14:
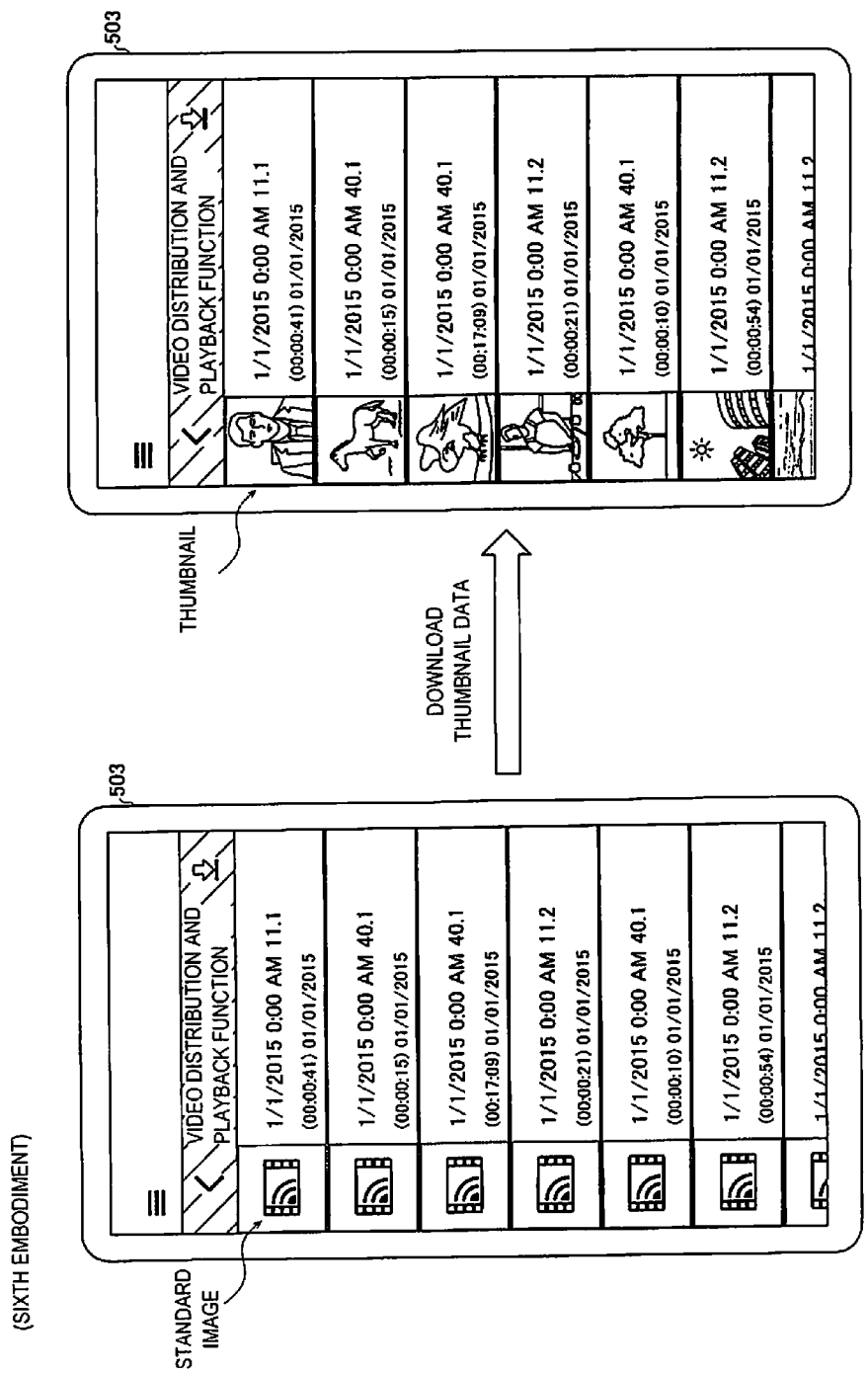
FIG. 14 is a diagram illustrating thumbnail production processing by the information device pertaining to the sixth embodiment.

More specifically, as shown in FIG. 14, the controller 534 is configured to send the download request for the video data to the distribution device 1 again when the seek playback table production processing is complete. Then, the controller 534 performs processing to produce thumbnails or thumbnail video (hereinafter referred to as "thumbnail production processing") in a list of the video data of the video distribution and playback function (see FIG. 4).

Here, the controller 534 is configured to send the download request for thumbnail data for producing the thumbnails or thumbnail video. More specifically, the controller 534 is configured to request part of the video data for which the thumbnail production processing is performed, as the thumbnail data, by designating the byte range. Consequently, the controller 534 produces the thumbnails or thumbnail video based on the downloaded thumbnail data (the video data from the designated byte range) that is downloaded in response to the download request after completing the seek playback table production processing.

The operation of the information device 503 related to the thumbnail production processing will now be described through reference to FIG. 14.

As shown in FIG. 14, with the video playback application 536, the list of the video data is displayed on the display component of the output component 30 when the video distribution and playback function (see FIG. 4) has been selected. Here, if no thumbnails or thumbnail video has been produced, then a preset standard image is displayed on the display component of the output component 30 in the list of the video data, as shown on the left side in FIG. 14.

If there is video data for which no thumbnail or thumbnail video has been produced, then the controller 534 sends the download request for the video data to the distribution device 1 again when the seek playback table production processing is complete. Furthermore, the controller 534 performs the thumbnail production processing based on the downloaded video data. As a result, as shown on the right side in FIG. 14, rather than the standard image, the produced thumbnail or thumbnail video is displayed on the display component of the output component 30 in the list of the video data when the video distribution and playback function (see FIG. 4) has been selected.

The rest of the configuration of the sixth embodiment is the same as in the third embodiment above.

Effect of Sixth Embodiment

The following effect is obtained with the sixth embodiment.

As discussed above, with the sixth embodiment, the controller 534 is configured to send the download request to the distribution device 1 again to further perform the thumbnail production processing that is different from the post-download processing for playing video data after completing download of the video data when the post-download processing is complete. Consequently, the fact that the specific length of time can be substantially extended by sending the download request again can be utilized to further perform the thumbnail production processing besides the post-download processing (seek playback table production processing).

The rest of the effect of the sixth embodiment is the same as in the third embodiment above.

Modification Examples

The embodiments disclosed herein are just examples in every respect, and should not be interpreted as being limiting in nature. The scope of the invention being indicated by the appended claims rather than by the above description of the embodiments, all modifications (modification examples) within the meaning and range of equivalency of the claims are included.

For example, various aspects of the present invention are given in the first to sixth embodiments above. However, the present invention is not limited to or by the aspects of these embodiments. The present invention encompasses aspects in which the configuration of one or more of the embodiments is suitably combined with the configuration of other embodiments.

Also, in the first to sixth embodiments above, a recording device is used as a distribution device, and a portable information device is used as an information device. However, the present invention is not limited to this. With the present invention, as long as it is capable of distributing the video data, some device other than a recording device (such as a server device) may be used as the distribution device. Also, as long as it is capable of downloading the video data, some information device other than a portable information device may be used.

Also, in the first to sixth embodiments above, part of the video data is requested from the distribution device when a download request is sent again. However, the present invention is not limited to this. With the present invention, all of the video data may be requested to the distribution device when the download request is sent again.

Also, in the first and second embodiments above, the HLS conversion processing is performed after completing download of the video data, while in the third to sixth embodiments, the seek playback table production processing is performed after completing download of video data. However, the present invention is not limited to this. With the present invention, as long as the processing is for playing the video data after completing download of the video data, some processing may be performed other than the HLS conversion processing or the seek playback table production processing after completing download of video data. Also, in the second embodiment, the seek playback table production processing may be performed instead of the HLS conversion processing, and in the fifth and sixth embodiments, the HLS conversion processing may be performed instead of the seek playback table production processing.

Also, in the first and second embodiments above, the downloaded video data is converted into the HLS format that is playable at the information device. However, the present invention is not limited to this. With the present invention, as long as the format is a playable at the information device, the conversion may be to some format other than HLS.

Also, in the third to sixth embodiments above, the seek playback table is produced as data for seek playback in which a playback location in video data is designated for playback. However, the present invention is not limited to this. With the present invention, data other than the seek playback table may be produced as the data used for the seek playback in which a playback location in video data is designated for playback.

Also, in the sixth embodiment above, the thumbnail production processing is performed as the processing that is different from the post-download processing for playing video data after completing download of the video data. However, the present invention is not limited to this. With the present invention, the processing other than the thumbnail production processing may be performed as the processing that is different from the post-download processing.

[1] In view of the state of the known technology and in accordance with a first aspect of the present invention, an information device is provided that comprises a communication component and a controller. The communication component is configured to communicate with an external device. The controller is configured to download video data from the external device through the communication component. The controller is configured to execute an application for playing the video data. The controller is configured to send a download request for the video data to the external device when post-download processing for playing the video data after completing download of the video data is not completed within a specific length of time while the application is running in the background.

With the information device pertaining to one aspect of the present invention, as discussed above, the controller is provided to send the download request for the video data to the external device again when the post-download processing is not completed within the specific length of time while the application is running in the background. Consequently, the video data can be downloaded again. After the download of the video data in response to the download request is complete, the measurement of the specific length of time is restarted and the post-download processing in the background can be started again. As a result, the specific length of time can be substantially extended. Thus, even when the download is performed while the application is running in the background, the application can complete the post-download processing (processing for playing the video data). This is particularly effective with a large amount of video data that tends to take a long time for the post-download processing.

[2] In accordance with a preferred embodiment according to the information device mentioned above, the controller is configured to repeat sending the download request until the post-download processing is complete.

[3] In accordance with a preferred embodiment according to any one of the information devices mentioned above, the controller is configured to resend the download request within the specific length of time.

[4] In accordance with a preferred embodiment according to any one of the information devices mentioned above, the controller is configured to delete the video data downloaded in response to the download request.

[5] In accordance with a preferred embodiment according to any one of the information devices mentioned above, the post-download processing includes processing to convert a format of the video data into a playable format, or processing to produce playback data that associates playback time of the video data and data volume of the video data. With this configuration, the processing to convert the format of the video data into the playable format can be completed, or the processing to produce playback data (e.g., seek playback data) can be completed, even when the download is performed while the application is running in the background. Also, no complicated processing is required for the processing to produce the playback data. Thus, the processing will take less time than the processing to convert the format of the video data into the playable format. As a result, it takes less time for the application to complete the post-download processing (the processing for playing the video data). Thus, even when the download request for the video data again is sent to the external device, this avoids an increase in the processing load on the controller.

[6] In accordance with a preferred embodiment according to any one of the information devices mentioned above, the controller is configured to send the download request for part of the video data to the external device. With this configuration, the download will take less time than when all of the video data is requested. As a result, it takes less time for the application to complete the post-download processing (the processing for playing the video data). Therefore, even when the download request for the video data again is sent to the external device, this avoids an increase in the processing load on the controller.

[7] In accordance with a preferred embodiment according to any one of the information devices mentioned above, the controller is configured to send the download request for all of the video data to the external device.

[8] In accordance with a preferred embodiment according to any one of the information devices mentioned above, the controller is configured to send the download request for the video data in a pre-conversion format to the external device when video data whose format is converted by the external device during download of the video data is downloaded through the communication component. Here, when the video data is downloaded while the format of the video data is converted by the external device, the conversion of the video data format can sometimes make it impossible to request part of the video data to the external device. In this case, if the video data of the pre-conversion format is requested, as discussed above, even though the video data is downloaded while the format of the video data is converted by the external device, part of the video data can still be requested from the external device.

[9] In accordance with a preferred embodiment according to any one of the information devices mentioned above, the controller is configured to specify a playback location in the video data based on the video data that has been downloaded and the playback data. With this configuration, the playback location can be specified more accurately than when the playback location in the video data is specified only based on the playback data.

[10] In accordance with a preferred embodiment according to any one of the information devices mentioned above, the controller is configured to play the video data while converting the video data in a playable format.

[11] In accordance with a preferred embodiment according to any one of the information devices mentioned above, the controller is configured to play the video data while converting the video data in a playable format from the playback location.

[12] In accordance with a preferred embodiment according to any one of the information devices mentioned above, the controller is configured to send the download request for the video data to the external device when the application has changed from the foreground to the background while the post-download processing is performed. Here, the post-download processing (the processing for playing the video data) is halted when the application changes or moves from the foreground to the background while the post-download processing is being performed. Thus, there may be times when the post-download processing cannot be completed. In view of this, with this configuration, the video data can be downloaded again even if the application changes or moves from the foreground to the background, and the post-download processing in the background can be newly started after the download in response to the download request is complete. As a result, the application can continue the post-download processing for the specific length of time that has newly started. Thus, even though the application changes or moves from the foreground to the background while the post-download processing is being performed, the application can still complete the post-download processing.

[13] In accordance with a preferred embodiment according to any one of the information devices mentioned above, the controller is configured to send the download request to the external device to perform other processing that is different from the post-download processing when the post-download processing is complete. With this configuration, the fact that the specific length of time can be substantially extended by sending the download request again can be utilized to allow the other processing to be performed besides the post-download processing (the processing for playing the video data).

[14] In accordance with a preferred embodiment according to any one of the information devices mentioned above, the processing that is different from the post-download processing includes processing to produce thumbnail or thumbnail video in a list of video data.

[15] In accordance with a preferred embodiment according to any one of the information devices mentioned above, the controller is configured to send the download request for thumbnail data.

[16] In accordance with a preferred embodiment according to any one of the information devices mentioned above, the controller is configured to halt the post-download processing when the post-download processing is not completed within the specific length of time, and the controller is configured to continue the post-download processing when the download of the video data is complete in response to the download request.

[17] In accordance with a preferred embodiment according to any one of the information devices mentioned above, the processing to convert the format of the video data into the playable format includes processing to divide the video data into a plurality of files and processing to produce a playlist for playing the files.

[18] In accordance with a preferred embodiment according to any one of the information devices mentioned above, the controller is configured to play the video data by designating the files based on the playlist.

[19] In accordance with a preferred embodiment according to any one of the information devices mentioned above, the controller is configured to send the download request for the part of the video data to the external device by specifying a data range of the part in the video data.

[20] In accordance with a preferred embodiment according to any one of the information devices mentioned above, the controller is configured to repeat sending the download request for the same part of the video data to the external device.

The present invention provides an information device with which an application can complete post-download processing even when the download is performed while the application is running in the background.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An information device comprising:
   a communication component that communicates with an external device; and
   a controller that runs an operating system to execute a video playback application, the controller sending a first download request for all of video data to entirely download the video data from the external device through the communication component using the video playback application, and executing a post-download processing for playing the video data after completing download of the video data using the video playback application, the operating system changing the video playback application to a suspended state in response to the first download request, changing the video playback application from the suspended state to a background in response to completing the download of the video data, and changing the video playback application from the background to the suspended state in response to a specific length of time elapsing after completing the download of the video data,
   the controller sending a second download request for only part of the video data that has been entirely downloaded to the external device using the video playback application in response to determining that the post-download processing for the video data that has been entirely downloaded is not completed within the specific length of time while the video playback application is running in the background.

2. The information device according to claim 1, wherein the controller repeats sending the second download request until the post-download processing is complete.

3. The information device according to claim 2, wherein the controller resends the second download request within a specific length of time.

4. The information device according to claim 1, wherein the controller deletes the part of the video data downloaded in response to the second download request.

5. The information device according to claim 1, wherein the controller executes the post-download processing that includes processing to convert a format of the video data into a playable format, or processing to produce playback data that associates playback time of the video data and data volume of the video data.

6. The information device according to claim 1, wherein the controller sends the second download request for the part of the video data in a pre-conversion format to the external device in response to determining that the video data whose format is converted by the external device during download of the video data is downloaded through the communication component.

7. The information device according to claim 5, wherein the controller specifies a playback location in the video data based on the video data that has been downloaded and the playback data.

8. The information device according to claim 7, wherein the controller plays the video data while converting the video data in a playable format.

9. The information device according to claim 7, wherein the controller plays the video data while converting the video data in a playable format from the playback location.

10. The information device according to claim 1, wherein the controller sends the second download request for the part of the video data to the external device in response to determining that the video playback application has changed from foreground to the background while the post-download processing is performed.

11. The information device according to claim 1, wherein the controller sends the second download request to the external device to perform other processing that is different from the post-download processing in response to determining that the post-download processing is complete.

12. The information device according to claim 11, wherein
the processing that is different from the post-download processing includes processing to produce thumbnail or thumbnail video in a list of video data.

13. The information device according to claim 12, wherein
the controller sends the second download request for thumbnail data.

14. The information device according to claim 1, wherein the controller halts the post-download processing in response to determining that the post-download processing is not completed within the specific length of time, and
the controller continues the post-download processing in response to determining that the download of the part of the video data is complete in response to the second download request.

15. The information device according to claim 5, wherein the processing to convert the format of the video data into the playable format includes processing to divide the video data into a plurality of files and processing to produce a playlist for playing the files.

16. The information device according to claim 15, wherein
the controller plays the video data by designating the files based on the playlist.

17. The information device according to claim 1, wherein the controller sends the second download request for the part of the video data to the external device by specifying a data range of the part in the video data.

18. The information device according to claim 1, wherein the controller repeats sending the second download request for the same part of the video data to the external device.

19. The information device according to claim 1, wherein the controller repeats sending the second download request until the post-download processing is complete,
the controller executes the post-download processing that includes processing to convert a format of the video data into a playable format, or processing to produce playback data that associates playback time of the video data and data volume of the video data,
the controller sends the second download request for the part of the video data to the external device in response to determining that the video playback application has changed from foreground to the background while the post-download processing is performed, and
the controller repeats sending the second download request for the same part of the video data to the external device.

* * * * *